United States Patent [19]

Kobayashi et al.

[11] 4,180,023

[45] Dec. 25, 1979

[54] ELECTRONICALLY-CONTROLLED FUEL INJECTION SYSTEM FOR INTERNAL COMBUSTION ENGINE HAVING ODD NUMBERS OF CYLINDERS

[75] Inventors: Akio Kobayashi, Kariya; Kunio Endo, Anjo; Norio Omori, Kariya, all of Japan

[73] Assignee: Nippondenso Co., Ltd., Kariya, Japan

[21] Appl. No.: 927,820

[22] Filed: Jul. 25, 1978

[30] Foreign Application Priority Data

Jul. 29, 1977 [JP] Japan .................................. 52/91540

[51] Int. Cl.$^2$ ............................................... F02B 5/00
[52] U.S. Cl. ........................... 123/32 EA; 123/32 ED; 123/32 AE
[58] Field of Search ........ 123/32 EA, 32 ED, 32 EB, 123/32 EC, 32 EH, 32 AE

[56] References Cited

U.S. PATENT DOCUMENTS

| | | | |
|---|---|---|---|
| 3,522,794 | 8/1970 | Reichardt | 123/32 EA |
| 3,606,869 | 9/1971 | Huntzinger et al. | 123/32 EA |
| 3,835,825 | 9/1974 | Baxendale et al. | 123/32 EH |
| 3,854,458 | 12/1974 | Reddy | 123/32 EA |
| 4,034,721 | 7/1977 | Lenzi et al. | 123/32 EB |

*Primary Examiner*—Charles J. Myhre
*Assistant Examiner*—P. S. Lall
*Attorney, Agent, or Firm*—Cushman, Darby & Cushman

[57] ABSTRACT

An electronically-controlled fuel injection system for an internal combustion engine having odd numbers of cylinders, in which the quantity of fuel supplied to the engine cylinders is regulated by the duration of pulses of a fuel injection pulse signal applied to solenoid-operated fuel injection valves, and two fuel injection pulses are generated in each operating cycle of the engine in synchronism with the revolution of the engine. In the system, the frequency of an ignition signal generated by an ignition unit for the engine is divided by the number of cylinders of the engine to provide a first pulse signal and a second pulse signal. The phase of each pulse of the second pulse signal lags behind that of the first pulse signal by n ignition pulse intervals where n is a multiple number of the half of the number obtained by subtracting unity from the number of cylinders of the engine. A third pulse signal is further generated in which the fall time of each pulse is delayed by the half of one ignition pulse interval relative to the fall time of the corresponding pulse in the second pulse signal. The fuel injection pulse signal is generated in synchronism with the fall time of the pulses of the first and third pulse signals.

5 Claims, 3 Drawing Figures

ELECTRONICALLY-CONTROLLED FUEL INJECTION SYSTEM FOR INTERNAL COMBUSTION ENGINE HAVING ODD NUMBERS OF CYLINDERS

BACKGROUND OF THE INVENTION

This invention relates to an electronically-controlled fuel injection system for an internal combustion engine, and more particularly to a system of the kind above described which is applied to an internal combustion engine having odd numbers of cylinders so as to initiate injection of fuel at intervals of a predetermined crank angle in synchronism with the revolution of the engine.

An electronically-controlled fuel injection system for an internal combustion engine is disclosed in, for example, Japanese Patent Application Kokai (Laid-Open) No. 9757/72. According to the disclosure of this application, the quantity of fuel to be supplied to the engine to meet the operating requirement of the engine is regulated by the duration of pulses of a fuel injection pulse signal applied to solenoid-operated fuel injection valves, and the fuel injection timing is selected to be synchronous with an ignition signal generated by an ignition unit for the engine so as to effect two fuel injections in each operating cycle (two revolutions) of the engine.

However, this known system is only applicable to an internal combustion engine having even numbers of cylinders such as four, six or eight cylinders and is not directly applicable to an internal combustion engine having odd numbers of cylinders such as three, five or seven cylinders. This is because, in the case of the latter engine, it is impossible to control the fuel injection timing on the basis of the ignition signal in such a manner that two fuel injections occur at equal time intervals in each operating cycle of the engine. That is, it occurs that a fuel injection timing exists between one ignition timing and the next, and it is unable to utilize the ignition signal in that form for the determination of the fuel injection timing. Thus, a revolution sensor for sensing the angular position of revolution of the engine at intervals of 180° is essentially required. However, additional mounting of such a revolution sensor on the engine is encountered with various practical problems including the problem of finding a suitable mounting space available in the narrow engine room of the vehicle, the problem of manufacturing and maintenance complexities due to the increase in the number of connection wires in the engine room, and the problem of increased costs due to the work required for mounting the sensor on the engine.

SUMMARY OF THE INVENTION

With a view to obviate the problems above described, it is a primary object of the present invention to provide a novel and improved electronically-controlled fuel injection system for an internal combustion engine having odd numbers of cylinders, which comprises a waveform reshaping circuit for reshaping the waveform of an ignition signal, a frequency divider circuit for dividing the frequency of the output pulse signal of the waveform reshaping circuit by the number of cylinders of the engine thereby providing two output pulse signals having therebetween a phase difference corresponding to n ignition pulse intervals where n is the half of the number obtained by subtracting unity from the number of cylinders of the engine, and a phase shift pulse generator circuit for generating, in response to the application of the output pulse signal having its phase lagging behind that of the other output pulse signal from the frequency divider circuit, a pulse signal in which the fall time of each pulse is delayed relative to that of the corresponding pulse in the input pulse signal by the half of one ignition pulse interval. The electronically-controlled fuel injection system according to the present invention is therefore advantageous in that it does not require a special revolution sensor for effecting two fuel injections in each operating cycle of the engine in synchronism with the ignition signal although the engine has odd numbers of cylinders, and the fuel injection can be carried out or started at equal time intervals or at intervals of 360° in crank angle.

DESCRIPTION OF THE PREFERRED EMBODIMENT

A preferred embodiment of the electronically-controlled fuel injection system according to the present invention as applied to a four-cycle five-cylinder internal combustion engine will now be described in detail with reference to the drawings.

Figure 1:
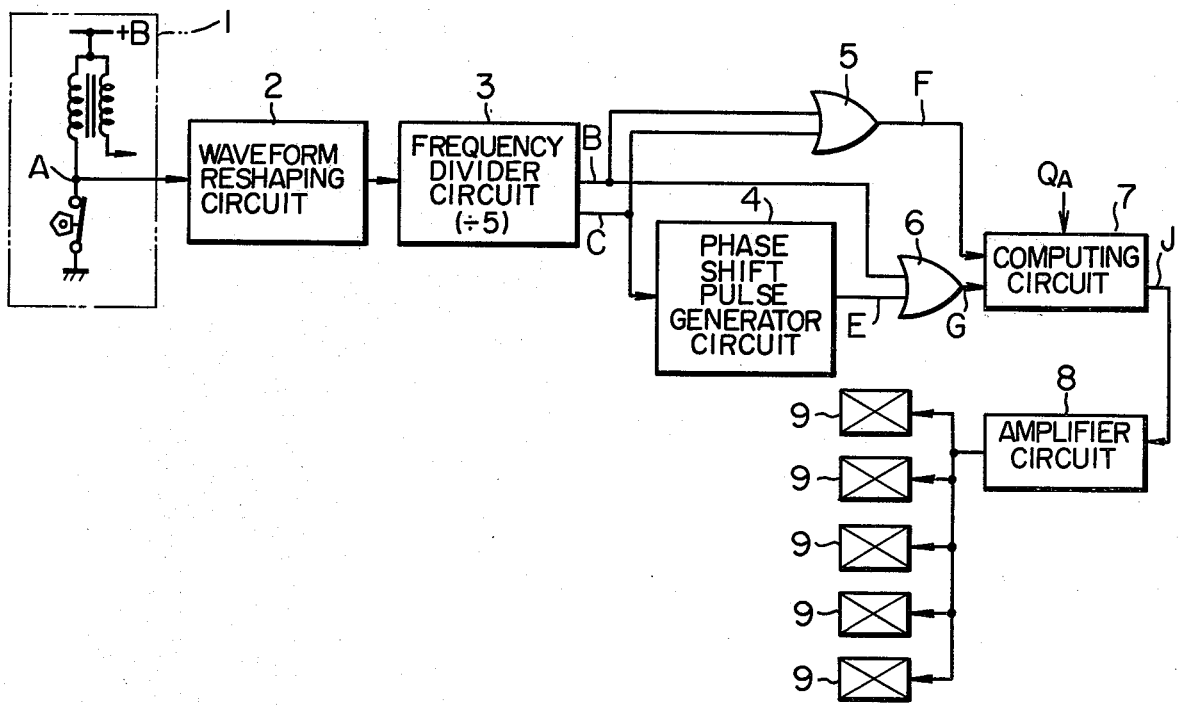
FIG. 1 is a block diagram of a preferred embodiment of the electronically-controlled fuel injection system according to the present invention.
Figure 3:
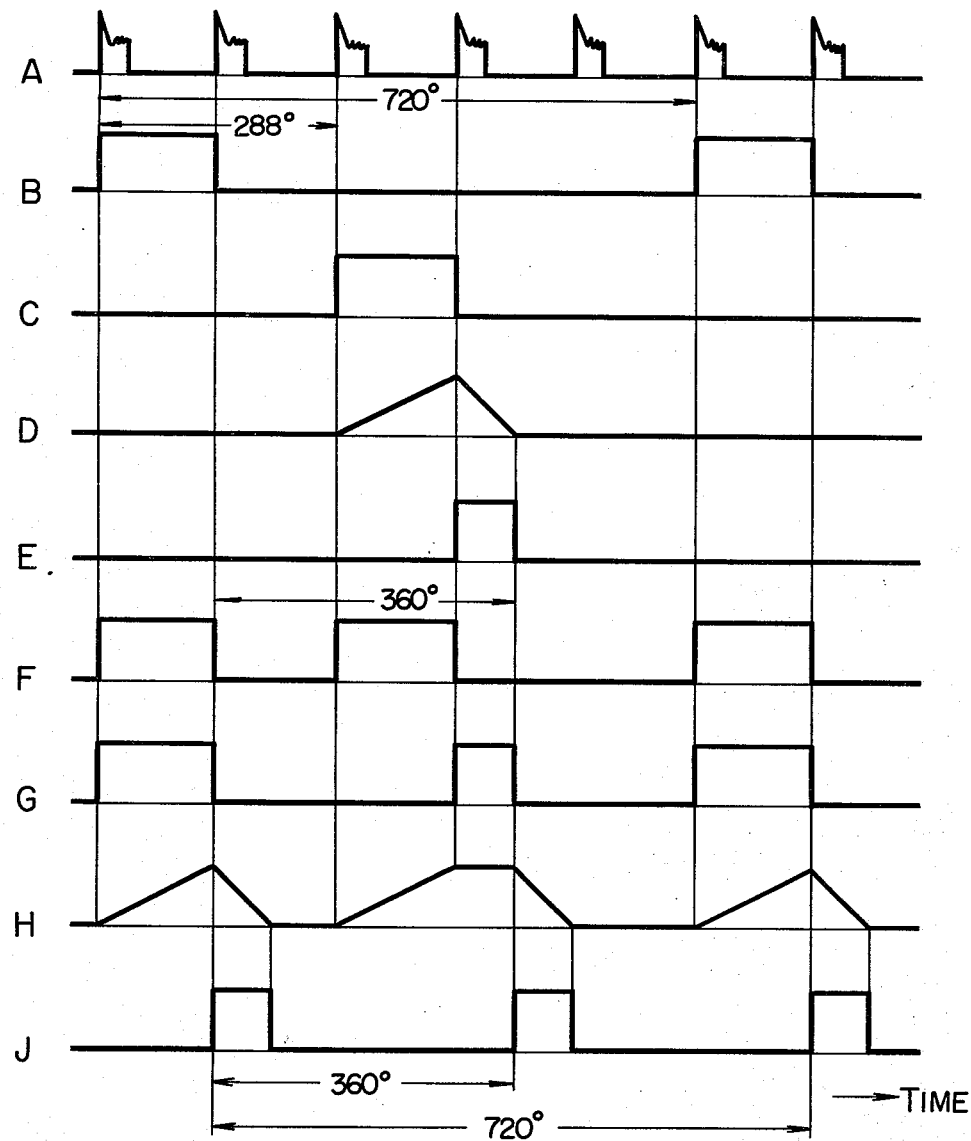
FIG. 3 is a waveform diagram showing signal waveforms appearing at various parts of FIGS. 1 and 2.

Referring to FIG. 1, the reference numeral 1 designates an ignition unit of the engine. An interrupted ignition signal A having a waveform as shown in FIG. 3A is applied from the primary winding of the ignition unit 1 to a waveform reshaping circuit 2 to be subjected to waveform reshaping, and the resultant output pulse signal is applied to a frequency divider circuit 3 which divides the input frequency by the factor of five which is the number of cylinders of the engine. The frequency divider circuit 3 generates two pulse signals B and C of different phase having waveforms as shown in FIGS. 3B and 3C, respectively. These two pulse signals B and C include pulses of the same pulse width, and the phase difference therebetween corresponds to n ignition pulse intervals where n is the half of the number obtained by subtracting unity from the number of cylinders of the engine. That is, this phase difference corresponds to two ignition pulse intervals or 288° in crank angle since the engine has five cylinders. The phase-lag output pulse signal C is applied from the frequency divider circuit 3 to a phase shift pulse generator circuit 4 which generates a pulse signal E having a waveform as shown in FIG. 3E. It will be seen from FIG. 3E that the pulse signal E includes a train of pulses each of which starts to rise at the fall time of the corresponding pulse of the input pulse signal C and lasts for a period of time equal to the half of one ignition pulse interval although only one of such pulses is shown. That is, each pulse of the pulse signal E has such a phase relationship with the corresponding pulse of the pulse signal C that the fall time of the former is delayed by the half of one ignition pulse interval relative to that of the latter. Thus, the phase relation between the fall time of each pulse of the output pulse signal E of the phase shift pulse generator circuit 4 and that of each pulse of the phase-lead pulse signal B in the two output pulse signals of the frequency divider circuit 3 is such that the former is delayed relative to the latter by 360° in crank angle.

The output pulse signal C of the frequency divider circuit 3 is also applied together with the other output pulse signal B to a first OR circuit 5 to appear therefrom as a pulse signal F having a waveform as shown in FIG. 3F. The phase-lead output pulse signal B in the two output pulse signals of the frequency divider circuit 3 is also applied together with the output pulse signal E of the phase shift pulse generator circuit 4 to a second OR circuit 6 to appear therefrom as a pulse signal G having a waveform as shown in FIG. 3G. The first and second OR circuits 5 and 6 are connected to a computing circuit 7. This computing circuit 7 is of known structure and may include such switching means as that disclosed in, for example, Japanese Patent Application Kokai (Laid-Open) No. 9757/72. In response to the application of the output pulse signal F of the first OR circuit 5, which signal is the combination of the two output pulse signals B and C of the frequency divider circuit 3, to the computing circuit 7, a capacitor in the computing circuit 7 is charged with a constant current as shown in FIG. 3H. The capacitor starts to discharge upon termination or at the fall time of each pulse in the output pulse signal G of the second OR circuit 6, which signal is the combination of the phase-lead output pulse signal B of the frequency divider circuit 3 and the output pulse signal E of the phase shift pulse generator circuit 4. A fuel injection pulse signal J having a waveform as shown in FIG. 3J appears from the computing circuit 7. The value of discharge current corresponds to the quantity $Q_A$ of engine intake air, and the duration of capacitor discharge determines the pulse width of the fuel injection pulse signal J which regulates the quantity of fuel supplied to the engine to be injected into the cylinders. The pulse width of this fuel injection pulse signal J is inversely proportional to the engine speed and directly proportional to the quantity $Q_A$ of engine intake air. The fuel injection starting timing is determined by the fall time of each pulse in the output pulse signal G of the second OR circuit 6, hence, by the fall time of each pulse in the combination of the output pulse signal B of the frequency divider circuit 3 and the output pulse signal E of the phase shift pulse generator circuit 4. Thus, fuel is injected at intervals of 360° in crank angle as shown in FIG. 3J. An amplifier circuit 8 amplifies the fuel injection pulse signal J applied from the computing circuit 7 to energize solenoid-operated fuel injection valves 9 associated with the individual cylinders.

Figure 2:
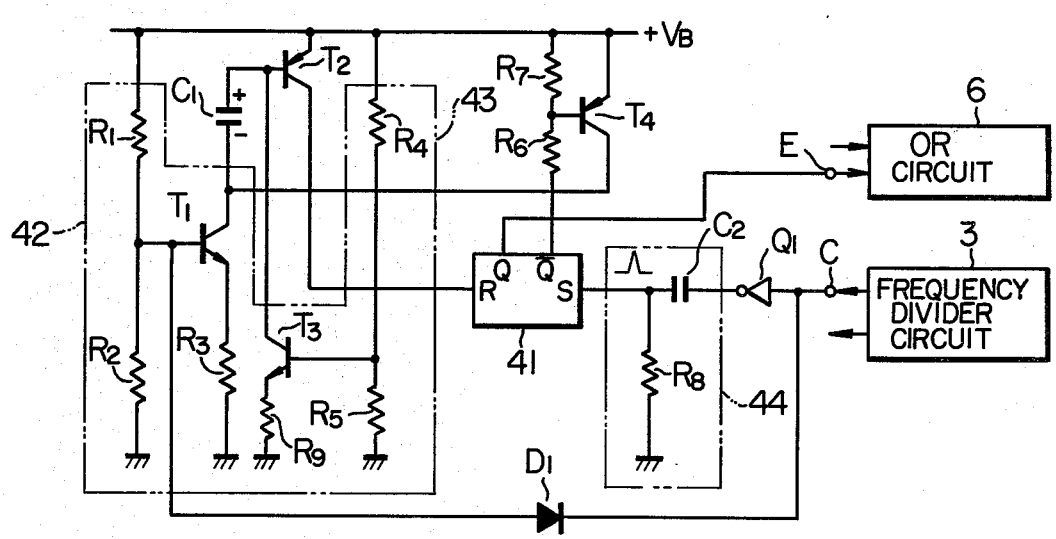
FIG. 2 is an electrical circuit diagram showing the detailed structure of the phase shift pulse generator circuit shown in FIG. 1.

FIG. 2 is an electrical circuit diagram showing the detailed structure of the phase shift pulse generator circuit 4. Referring to FIG. 2, the phase shift pulse generator circuit 4 includes resistors $R_1$ to $R_9$, capacitors $C_1$, $C_2$, transistors $T_1$ to $T_4$, a diode $D_1$, an RS flip-flop (abbreviated hereinafter as an RS-FF) 41, and an inverter $Q_1$. The resistors $R_1$, $R_2$, $R_3$ and the transistor $T_1$ constitute a regulated current supply circuit 42, and the resistors $R_4$, $R_5$, $R_9$ and the transistor $T_3$ constitute a regulated current discharge circuit 43. The resistor $R_8$ and the capacitor $C_2$ constitute a differentiating circuit 44.

In response to the application of a pulse of the phase-lag output pulse signal C of the frequency divider circuit 3 to the input terminal, the diode $D_1$ is rendered non-conducting, and the regulated current supply circuit 42 starts to operate. In the lasting period of each pulse of the input pulse signal C, the capacitor $C_1$ is charged with a constant current, as shown in FIG. 3D, through the emitter-base circuit of the transistor $T_2$. Upon termination or disappearance of each pulse in the input pulse signal C, this charging with the constant current is completed, and at the same time, the signal inverted by the inverter $Q_1$ is differentiated by the differentiating circuit 44 to provide a positive trigger signal which is applied to the RS-FF 41 to set the same. Consequently, a high level (abbreviated hereinafter as an H level) and a low level (abbreviated hereinafter as an L level) appear at the Q output terminal and $\overline{Q}$ output terminal respectively of the RS-FF 41, thereby turning on the transistor $T_4$ through the resistor $R_6$. Since the transistor $T_1$ is in its cut-off state at this time, the power supply potential $+V_B$ appears at the negative terminal of the capacitor $C_1$. The potential at the positive terminal of the charged capacitor $C_1$ becomes higher than the power supply potential $+V_B$, and the base-emitter circuit of the transistor $T_2$ is reverse biased to turn off the transistor $T_2$. At the same time, the capacitor $C_1$ starts to discharge a constant current through the regulated current discharge circuit 43 in a manner as shown in FIG. 3D. Then, when the potential at the positive terminal of the capacitor $C_1$ is reduced to lower than the power supply potential $+V_B$ again, the transistor $T_2$ is turned on to reset the RS-FF 41 thereby restoring the RS-FF 41 to its original state in which the Q and $\overline{Q}$ output terminals are at the L and H levels respectively.

Each pulse of the output pulse signal E of the phase shift pulse generator circuit 4, having a waveform as shown in FIG. 3E appears during the period of time in which the Q output terminal of the RS-FF 41 is maintained in its H level. It is so regulated that the terminating or fall time of each pulse in this output pulse signal E of the phase shift pulse generator circuit 4 is delayed relative to that of the corresponding pulse in the phase-lag output pulse signal C of the frequency divider circuit 3 by the half of one ignition pulse interval. More concretely, the period of charging the capacitor $C_1$ with the constant current supplied from the regulated current supply circuit 42 is determined by the pulse width of the pulse signal C corresponding to one ignition pulse interval or 144° in crank angle. Therefore, when the value of the discharge current of the capacitor $C_1$ discharging through the regulated current discharge circuit 43 is selected to be two times the value of the charge current supplied from the regulated current supply circuit 42, the discharge period can be reduced to the half of the charge period so that the terminating or fall time of each pulse of the pulse signal E can be delayed relative to that of the corresponding pulse of the pulse signal C by the half of one ignition pulse interval. The value of the discharge current may be selected to be four times that of the charge current when the period of charging the capacitor $C_1$, that is, the pulse width of each pulse of the pulse signal C extends over two ignition pulse intervals or 288° in crank angle.

In operation, an ignition signal A having a waveform as shown in FIG. 3A is applied from the ignition unit 1 to the waveform reshaping circuit 2 to be subjected to waveform reshaping, and the resultant output pulse signal of the waveform reshaping circuit 2 is applied to the frequency divider circuit 3 which divides the input frequency by the factor of five which is the number of cylinders of the engine. The frequency divider circuit 3 provides two output pulse signals B and C which have a phase difference corresponding to two ignition pulse intervals as shown in FIGS. 3B and 3C, and these two output pulse signals B and C are applied to the computing circuit 7 through the first OR circuit 5, as a composite pulse signal F having a waveform as shown in FIG. 3F. During the lasting period of each pulse in this input pulse signal F, the capacitor in the computing circuit 7 is charged with a constant current as shown in FIG. 3H. In the meantime, the phase-lag output pulse signal C of the frequency divider circuit 3 is applied to the phase shift pulse generator circuit 4 to appear as a pulse signal E having a waveform as shown in FIG. 3E in which the fall time of each pulse is delayed relative to that of the corresponding pulse in the pulse signal C by the half of one ignition pulse interval. This output pulse signal E of the phase shift pulse generator circuit 4 is applied together with the phase-lead output pulse signal B of the frequency divider circuit 3 to the computing circuit 7 through the second OR circuit 6 as a composite pulse signal G having a waveform as shown in FIG. 3G. At the fall time of each pulse of the pulse signal G, the charged capacitor in the computing circuit 7 starts to discharge a constant current the value of which is inversely proportional to the quantity $Q_A$ of engine intake air, as shown in FIG. 3H. The computing circuit 7 generates a fuel injection pulse signal J having a waveform as shown in FIG. 3J in which each pulse has a pulse width corresponding to the period from the start to the end of the capacitor discharge. This fuel injection pulse signal J is applied, after being amplified by the amplifier circuit 8, to the solenoid-operated fuel injection valves 9 to inject fuel into the cylinders of the engine. Each pulse of this fuel injection pulse signal J starts to rise at the terminating or fall time of the corresponding pulse of the output pulse signal G appearing from the second OR circuit 6 as a result of application of the pulse signals B and E. Since each pulse in the pulse signal B and the corresponding pulse in the pulse signal E have a phase difference corresponding to the half cycle of engine operation or a phase difference of 360° in crank angle, two fuel injection pulses of the fuel injection pulse signal J appear at equal time intervals in each operating cycle (two revolutions) of the engine. The capacitor in the computing circuit 7 is charged with the constant current at time intervals of one ignition pulse interval, and the charge stored in the capacitor is inversely proportional to the engine speed. On the other hand, the value of the discharge current is directly proportional to the quantity $Q_A$ of the engine intake air. Therefore, each pulse of the fuel injection pulse signal J has a pulse width inversely proportional to the engine speed and directly proportional to the quantity $Q_A$ of engine intake air so as to meet the operating requirement of the engine.

We claim:

1. An electronically-controlled fuel injection system for an internal combustion engine having odd numbers of cylinders, in which the quantity of fuel supplied to the engine cylinders is regulated by the duration of pulses of a fuel injection pulse signal applied to solenoid-operated fuel injection valves, and two fuel injection pulses are generated in each operating cycle of the engine, said system comprising:
   a waveform reshaping circuit for reshaping the waveform of an ignition signal supplied from an ignition unit for the engine;
   a frequency divider circuit connected to said waveform reshaping circuit for dividing the frequency of the output pulse signal of said waveform reshaping circuit by the number of cylinders of the engine thereby generating a first and a second pulse signals, the phase of each pulse in said second pulse signal lagging behind that of the corresponding pulse in said first pulse signal by n ignition pulse intervals where n is a multiple of the half of the number obtained by subtracting unity from the number of cylinders of the engine;
   a phase shift pulse generator circuit connected to said frequency divider circuit for generating a third pulse signal in which the terminating or fall time of each pulse is delayed relative to that of the corresponding pulse in said second pulse signal by the half of one ignition pulse interval; and
   computing means connected to said frequency divider circuit and said phase shift pulse generator circuit for generating the fuel injection pulse signal including a train of pulses each appearing in response to the termination of the corresponding pulses in said first and third pulse signals, said fuel injection pulse signal being applied to said solenoid-operated fuel injection valves which inject fuel into the cylinders of the engine.

2. An electronically-controlled fuel injection system as claimed in claim 1, wherein said phase shift pulse generator circuit comprises:
   capacitor means;
   current regulator circuit means connected to said frequency divider circuit and said capacitor means for charging said capacitor means with a constant current value during only the lasting period of each pulse of said second pulse signal, and in response to the completion of charging, discharging said capacitor means with a current value obtained by multiplying m by said constant current value, where m is two times the value obtained by dividing the pulse width of each pulse of said second pulse signal by the ignition pulse interval; and
   means connected to said current regulator circuit means for generating each pulse of said third pulse signal during only the period from the start to the end of the current discharge from said capacitor means.

3. An electronically-controlled fuel injection system as claimed in claim 2, wherein said current regulator circuit comprises:
   a transistor connected to said capacitor means for charging said capacitor means with said constant current value; and
   diode means connected between the input terminal of said transistor and said frequency divider circuit for turning on said transistor during only the lasting period of each pulse of said second pulse signal.

4. An electronically-controlled fuel injection system as claimed in claim 2 or 3, wherein said pulse generating means is an RS flip-flop.

5. An electronically-controlled fuel injection system as claimed in claim 1, further comprising:
   an OR circuit connected at its input terminals to said phase shift pulse generator circuit and said frequency divider circuit and at its output terminal to said computing means for generating a pulse signal which is the logical sum of said first and third pulse signals.

* * * * *